US008663496B2

(12) United States Patent
Branlard et al.

(10) Patent No.: US 8,663,496 B2
(45) Date of Patent: *Mar. 4, 2014

(54) DOUBLE-LAYERED COMPACTED SOLID WATER-PURIFICATION PRODUCT

(75) Inventors: Paul Branlard, Lyons (FR); Philippe Desmarescaux, Lyons (FR); Murielle Moneron, Saint Just Saint Rambert (FR)

(73) Assignee: Eurotab, Saint Just Saint Rambert (FR)

( * ) Notice: Subject to any disclaimer, the term of this patent is extended or adjusted under 35 U.S.C. 154(b) by 1821 days.

This patent is subject to a terminal disclaimer.

(21) Appl. No.: 11/628,742

(22) PCT Filed: Jul. 18, 2005

(86) PCT No.: PCT/FR2005/001834
§ 371 (c)(1),
(2), (4) Date: Jan. 19, 2007

(87) PCT Pub. No.: WO2006/016073
PCT Pub. Date: Feb. 16, 2006

(65) Prior Publication Data
US 2008/0039317 A1 Feb. 14, 2008

(30) Foreign Application Priority Data
Jul. 19, 2004 (FR) ..................... 04 07968

(51) Int. Cl.
C02F 5/02 (2006.01)
C02F 5/08 (2006.01)
C02F 5/10 (2006.01)
C02F 1/52 (2006.01)
C02F 1/56 (2006.01)
C02F 1/76 (2006.01)
B01J 20/02 (2006.01)

(52) U.S. Cl.
USPC ........... 252/176; 156/288; 210/139; 210/223; 210/667; 210/706; 210/721; 210/723; 210/728; 210/730; 210/731; 210/732; 210/733; 210/756; 252/175; 252/181; 502/406; 510/224; 510/228; 510/230; 510/231; 510/233; 510/375; 510/378; 510/402

(58) Field of Classification Search
USPC ......... 210/666, 223, 667, 728, 755, 176, 180, 210/181, 139, 756, 706, 721, 723, 730, 731, 210/732, 733; 252/175, 181, 176; 510/224, 510/228, 230, 231, 233, 375, 378, 402; 156/288; 502/406
See application file for complete search history.

(56) References Cited

U.S. PATENT DOCUMENTS

| 5,023,012 A | 6/1991 | Buchan et al. |
| 5,213,794 A * | 5/1993 | Fritsch et al. .............. 424/78.01 |
| 5,607,552 A * | 3/1997 | Andersson et al. ........ 162/181.6 |
| 5,681,475 A * | 10/1997 | Lamensdorf et al. ......... 210/666 |
| 5,783,540 A | 7/1998 | Secemski et al. |
| 6,103,065 A * | 8/2000 | Humphreys et al. ....... 162/181.8 |
| 6,194,368 B1 | 2/2001 | Waschenbach et al. |
| 6,372,255 B1 * | 4/2002 | Saslawski et al. ............ 424/473 |
| 6,686,329 B1 * | 2/2004 | Salager ........................ 510/446 |
| 2004/0026657 A1 * | 2/2004 | Souter et al. .................. 252/181 |
| 2004/0040915 A1 | 3/2004 | Connelly, Jr. |
| 2010/0025626 A1 * | 2/2010 | Branlard et al. .............. 252/175 |

FOREIGN PATENT DOCUMENTS

| EP | 0 066 421 A1 | 12/1982 |
| EP | 0 851 024 A2 | 7/1998 |
| FR | 2 243 156 | 4/1975 |
| WO | WO 96/32194 A1 | 10/1996 |
| WO | WO 02/00557 A2 | 1/2002 |

OTHER PUBLICATIONS

L. V. Gandurina and E. I. Gervits, Treathent of Oil-Contaiking Wastewater Using Activated Silicic Acid as a Flocculakt, Environhiental Protection, 449-450, (1988) 1988 Plenum Publishing Corporation.*
Flocculants.info pamphlet, http://www.flocculants.info/, available online, updated Jan. 2007.*

* cited by examiner

Primary Examiner — Bijan Ahvazi
(74) Attorney, Agent, or Firm — Oliff PLC

(57) ABSTRACT

The invention relates to a double-layered compacted solid water-purification product, comprising at least one first layer and at least one second layer, characterized in that the first layer comprises at least one flocculating system and at least one dispersion system, the second layer comprises at least one disinfectant which liberates free chlorine on contact with water and at least one excipient for the disinfectant, whereby said excipient releases the disinfectant into the water at a controlled rate such that the combination of excipient and disinfectant releases 0.1 to 100 mg/l of free chlorine per hour. The invention further relates to the method for production of such a product.

18 Claims, No Drawings

DOUBLE-LAYERED COMPACTED SOLID WATER-PURIFICATION PRODUCT

The present invention relates to a compacted solid product for the purification of water in the form of at least two layers.

The treatment of water for the purpose of purifying it and/or of rendering it drinkable forms the subject of much research and is a subject vital to mankind.

In parallel with the development of large-scale purification plants for the treatment of water of large urban areas, in particular in industrialized countries, a search is also under way to develop simple means for the effective and rapid treatment of a predetermined volume of water with the aim, for example, of rendering drinkable water resulting from a natural watering place, such as a well or a pond, in parts of the world which may not benefit, for reasons of difficult access or for economic reasons, from industrial plants for the treatment of water. Such means might also be used to purify water which, although not intended for daily consumption, has to be able to be drunk without danger to the health of the person who has inadvertently ingested it.

The purification of any water, in particular for the purpose of rendering it drinkable, implies several treatments and in particular a clarification stage, intended to separate organic matter liable to be suspended in the water, and a disinfection stage, intended to kill the bacteria present in the water. Clarification is generally carried out by flocculation and/or coagulation, followed by sedimentation and filtration of the organic substances. Disinfection is generally carried out by release of bactericidal active chlorine.

Furthermore, for practical reasons of handling and of storage, and in view of the use desired, attempts are being made to have available a means for purification of water in the form of a solid composition, such as, for example, a pellet or a tablet, preferably predosed, which can be simply plunged into the predetermined volume of water to be purified, without it being necessary to employ more complex means than simple limited stirring.

Solid compositions for clarifying and disinfecting water are already known.

The document WO 96/32194 discloses compositions in the form of tablets for purifying a predetermined volume of water comprising, inter alia, a flocculating agent, a disinfectant which releases active chlorine and an effervescent agent. However, in this document, these three compounds are released simultaneously and at the same point in the volume of water to be purified. It is found that that the active chlorine is rapidly consumed and that a large amount of disinfectant is necessary to purify the water.

The document FR 2 243 156 discloses a structure comprising adjacent and separate components, in particular in the form of compressed tablets comprising two layers, each layer comprising a different disinfectant, one which dissolves rapidly, the other which dissolves slowly. In this document, the aim is to treat the water of a swimming pool by bringing about, in a first step, superchlorination by the release of the active chlorine of the disinfectant which dissolves rapidly and, in a second step, slow release of the available chlorine of the disinfectant which dissolves slowly in order to maintain the necessary level of chlorine for long periods in the swimming pool. The structure thus disclosed in FR 2 243 156 also consumes large amounts of disinfectants.

In point of fact, water comprising large dosages of disinfectants has highly spoilt organoleptic properties. This particularly presents a problem when the aim of the treatment is to render the water drinkable for daily consumption. The water does not have a good taste and is not pleasant to drink.

Furthermore, for both ecological and economic reasons, it will be advantageous to have available a means for purifying water which consumes little in the way of disinfectant while being as effective as the purification means already known.

Thus, there exists a need for a composition, simple to handle, to store and to use, which would make it possible both to clarify, by flocculation, and to disinfect, by bactericidal action, a predetermined volume of any water, in particular in order to render it drinkable, without it being necessary to consume large amounts of disinfectant.

The present invention is targeted at overcoming this problem by providing a single solid composition, in particular in the form of a pellet or of a tablet, which is capable of effectively clarifying and disinfecting any water without overconsumption of disinfectant.

A first subject matter of the invention is a compacted solid product for the purification of water comprising at least one first layer and at least one second layer, characterized in that:
the first layer comprises at least one flocculating system and at least one disintegrating system,
the second layer comprises at least one disinfectant which releases active chlorine on contact with water and at least one excipient for the disinfectant, said excipient releasing the disinfectant into the water at a controlled rate such that the excipient-disinfectant combination releases from 0.1 to 100 mg/l of active chlorine per hour.

The product according to the invention makes it possible to efficiently clarify and disinfect any water, whatever its source and its state. Thus, the water from a pond or from a well can be purified with the product according to the invention.

By virtue of the specific layout and the respective specific compositions of its two layers, the product according to the invention makes it possible to release, in a first step, the flocculating agent, which precipitates the suspended organic substances, and then, in a second step, while the flocs formed by the precipitation of the organic substances and of the flocculating agent are separated by settling, the disinfecting agent, for a biocidal action targeted at the bacteria present in the water.

The product according to the invention is ecological and economic: it does not consume more disinfectant than necessary. Due to its solid form, it is simple and practical to use, to store and to handle.

By virtue of the product according to the invention, filtration of the water is not necessary.

By virtue of the product according to the invention, the release of active chlorine is controlled, whatever the intrinsic rate of dissolution of the disinfectant in the water. Thus, any disinfectant can be used, which results in simplicity of manufacture of the product.

The product according to the invention is a compacted solid product comprising at least two layers.

The first layer of the product according to the invention comprises at least one flocculating system and at least one disintegrating system.

The term "flocculating system" is understood to mean, according to the present patent application, a system having a compound or compounds which will react with the organic substances present in suspension in the water to be purified, causing them to precipitate in the form of flocs, that is to say of solids with a density of greater than 1, which will, after separation by settling, settle and form sediment at the bottom of the volume of water to be purified. The flocculating system thus makes it possible to clarify the water to be treated.

Preferably, the flocculating system comprises at least one trivalent metal salt and at least one water-soluble cationic polymer. This is because the combination of a trivalent metal salt, which is a coagulant, and of a cationic polymer, which is a flocculant, makes possible good flocculation and better aggregation of the flocs formed by precipitation.

Preferably, the trivalent metal salt is chosen from iron sulfate, aluminum sulfate, polyaluminum hydroxychloride and their mixtures. More preferably, the trivalent metal salt is polyaluminum hydroxychloride.

These compounds are well known and are available commercially. A compound which is particularly preferred for the trivalent metal salt of the present invention is the polyaluminum hydroxychloride sold in the powder form under the trade name "PAC® 32" by SNF.

Preferably, the trivalent metal salt is present in the volume of water to be treated at a content ranging from 10 to 30 ppm, expressed as $Al_2O_3$.

Preferably, the water-soluble cationic polymer is a diallyldimethylammonium chloride water-soluble cationic polymer, preferably of very high molecular weight, for example with a molecular weight of greater than or equal to 500 000 D. A compound which is particularly suitable for the present invention is the diallyldimethylammonium chloride polymer sold in the powder form under the trade name "POLYDADMAC® DB45 SH" by SNF.

Preferably, the cationic polymer is present in the volume of water to be treated at a content ranging from 1 to 2 ppm.

The term "disintegrating system" is understood to mean, according to the present invention, a system with a compound or compounds which will react immediately on contact with the water to result in the rapid disintegration, preferably in less than one minute, more preferably in less than 30 seconds, of the first layer.

Preferably, the disintegrating system comprises at least one disintegrating agent chosen from cellulose and its derivatives, the effervescent combinations of a water-soluble polyorganic acid and of a weak base, and their mixtures.

In one embodiment of the invention, the disintegrating agent is a cellulose, for example an amorphous or crystalline cellulose. An example of an amorphous cellulose which is suitable for the present invention is the product sold under the trade name "ARBOCEL® A300" by J. Rettenmaier & Söhne. An example of a crystalline cellulose which is suitable for the present invention is the product sold under the trade name "VIVAPUR® 12" by J. Rettenmaier & Söhne.

In another embodiment of the invention, the disintegrating agent is an effervescent combination of a water-soluble polyorganic acid and of a weak base. In this case, the water-soluble polyorganic acid is preferably chosen from citric acid, malic acid, tartaric acid, malonic acid, fumaric acid, maleic acid, succinic acid and their mixtures. Preferably, the weak base is sodium bicarbonate.

Preferably, the disintegrating agent is present in the first layer at a content of less than or equal to 50% by weight, preferably at a content ranging from 20% to 40% by weight, with respect to the weight of the first layer.

This is because it has been found that, above a concentration of 50% by weight of disintegrating agent in the first layer, the separation by settling of the flocs formed is greatly slowed down, delaying the clarification of the water to be treated.

The combination of a flocculating system and of a disintegrating system as defined above in the first layer of the product according to the invention makes it possible to rapidly diffuse the coagulants and the flocculants into the water to be treated, this being due to the immediate disintegration, preferably in less than one minute and more preferably in less than thirty seconds, of this first layer on contact with the water. Thus, the clarification of the water can take place without delay. The sedimentation of the precipitated materials takes place in a few minutes and results in water being obtained which exhibits a very low turbidity.

The second layer of the product according to the invention comprises at least one disinfectant which releases active chlorine on contact with water and at least one excipient for the disinfectant, said excipient releasing the disinfectant in the water at a controlled rate such that the excipient-disinfectant combination releases from 0.1 to 100 mg/l of active chlorine per hour.

The disinfectant which releases active chlorine can be any chlorine derivative known to release active chlorine, whatever the intrinsic rate of dissolution of this derivative in water. Preferably, the disinfectant is chosen from the sodium salt of N-chloro-4-methylbenzenesulfonamide in the anhydrous or dihydrate form, the sodium salt of 1,3-dichloro-s-triazine-2, 4,6-trione in the anhydrous or dihydrate form, and their mixtures. More preferably, the disinfectant is the sodium salt of 1,3-dichloro-s-triazine-2,4,6-trione in the dihydrate form.

These compounds are well known and are available commercially from OXYCHEM.

The term "excipient" is understood to mean, within the meaning of the present patent application, one or more compounds other than the disinfectant which act as vehicle for this disinfectant and which furthermore are chemically inert with regard to the disinfectant, that is to say which do not react with it, both when the product of the invention is in the stored form and when it is used in the water to be purified.

The excipient of the second layer of the product according to the invention releases the disinfectant into the water at a controlled rate such that the excipient-disinfectant combination releases from 0.1 to 100 mg/l of active chlorine per hour, preferably at a rate ranging from 0.2 to 10 mg/l of active chlorine per hour. Thus, the diffusion of the disinfectant into the water to be treated is gradual and controlled and does not interfere with the clarification stage.

In one embodiment of the invention, the excipient is chosen from water-soluble compounds which dissolve slowly. Thus, preferably, the excipient is chosen from gum arabic or acacia, gum tragacanth, locust bean gum, xanthan gum, guar gum and their mixtures.

Thus, during the gradual dissolution of the excipient in the water, the disinfectant is gradually released and diffuses into the water to be treated.

In another embodiment, the excipient is chosen from hydrophilic insoluble compounds which swell in water. Thus, preferably, the excipient is chosen from modified starches, gelatinized starches, potato starch and their mixtures. An example of a gelatinized starch which is particularly suitable for the present invention is the product sold under the trade name "LYCATAB® PGS" by Roquette.

In the case where the excipient is such a hydrophilic insoluble compound which swells in water, the gradual release of the disinfectant into the water to be treated takes place by the diffusion of the water within the insoluble excipient.

Thus, by virtue of the presence of the specific excipient which controls the release of the disinfectant in the second layer and owing to the fact that this second layer is separate from the first layer, the disinfectant is not entrained with the coagulating and flocculating agents of the first layer, which diffuse very rapidly into the water by virtue of the disintegrating system. The disinfectant is thus not prematurely consumed by the substances in suspension before the latter are precipitated and form sediment at the bottom of the volume of water to be treated.

The second layer of the product according to the invention remains intact during the first phase of the treatment, that is to say during the clarification, which generally lasts less than one minute, indeed even less than 30 seconds. The second layer can subsequently carry out its role of disinfecting by gradual and continuous release, in a few hours, of the disinfectant which will be able to act on the pathogenic microorganisms liable to be present in the water to be treated, without interfering with the flocs formed during the first phase, concentrated at the bottom of the volume to be treated.

In a preferred embodiment of the invention, the density of the second layer is strictly less than 1 and preferably ranges from 0.70 to 0.95. Thus, at the end of the first phase, when the first layer has completely broken up, the second layer rises again and floats. It is then totally remote from the flocs formed during the first phase and the gradual and continuous diffusion of the disinfectant can take place under the best conditions and without excessive and pointless consumption of disinfecting agent.

The product according to the invention can comprise additional compounds, such as colorants, fragrances, and the like.

Preferably, all the compounds constituting the product according to the invention are of food grade, that is to say can be ingested by man without endangering his health.

The product according to the invention can have any possible geometric shape. In one embodiment of the invention, the product is in the form of a pellet or a tablet and the two layers are adjacent.

In another embodiment of the invention, is in the form of a compressed tablet or a ball, the first layer coating the second layer, which forms a core.

Another subject matter of the invention is a process for the preparation of a compacted solid product for the purification of water comprising at least one first layer and at least one second layer, characterized in that it comprises the following stages:
a) a first mixture of at least one flocculating system and of at least one disintegrating system is prepared in the powder form,
b) a second mixture of at least one disinfectant which releases active chlorine on contact with water and of at least one excipient for the disinfectant, said excipient releasing the disinfectant into the water at a controlled rate such that the excipient-disinfectant combination releases from 0.1 to 100 mg/l of active chlorine per hour, is prepared in the powder form,
c) the mixture obtained in b) is precompacted in a pelleting machine,
d) the mixture obtained in a) is added to the pelleting machine and the combined mixture is compacted in order to obtain a two-layer product.

The product according to the invention is preferably prepared by direct compression using a pelleting machine. This process is known.

In another embodiment, the product according to the invention can comprise, in addition to the first layer and the second layer, one or more additional layers, such as, for example, an intermediate layer which separates the first layer and the second layer or also an external layer.

The degree of compaction of the first layer and that of the second layer are adjusted according to the respective rates of dissolution desired for each of these layers within the water to be treated.

The present invention will now be illustrated using the following examples.

EXAMPLES

The meanings of the terms used in the examples which follow are given below:

PAC® 32: polyaluminum hydroxychloride in the powder form, sold by SNF.
PolyDADMAC® DB45.5H: diallyldimethylammonium chloride water-soluble cationic polymer in the powder form, sold by SNF.
DCCNa.2H$_2$O: sodium salt of 1,3-dichloro-s-triazine-2,4,6-trione in the dihydrate form, also known as sodium dichloroisocyanurate in the dihydrate form, in the powder form.
LYCATAB® PGS: gelatinized starch in the powder form, sold by Roquette.
ARBOCEL® A300: amorphous cellulose, sold by J. Rettenmaier & Söhne Example 1

According to the Invention

This example illustrates the invention in the case where the excipient of the second layer is a water-soluble compound which dissolves slowly.

10 liters of turbid water (approximately 400 FTU), prepared from initially drinkable water to which 0.015 g/l of humic acid and 0.5 g/l of kaolin have been added, are available. The pH is in the vicinity of 8.

For the purpose of treating this volume of 10 liters of turbid water, a two-layer pellet weighing 2.000 g is prepared, the first layer, which provides for the clarification, being referred to as layer A and weighing 1.000 g and the second layer, which provides for the disinfecting of the water to be treated, being referred to as layer B and weighing 1.000 g. The diameter and the thickness of the pellet are respectively 20 mm and 3.6 mm. The pellet is prepared by direct compression. The composition of the layers and the resulting level of each ingredient in the volume of water to be treated are given below:

| Composition layer A | mg in layer A | mg/l of water to be treated |
|---|---|---|
| Sodium bicarbonate | 255.5 | 25.5 |
| Citric acid | 109.5 | 10.9 |
| PAC ® 32 | 625.0 | 20* |
| PolyDADMAC ® DB45SH | 20.0 | 2 |

*Expressed as Al$_2$O$_3$

| Composition layer B | mg in layer B | mg/l of water to be treated |
|---|---|---|
| Gum acacia | 962.2 | 96.2 |
| DCCNa•2H$_2$O | 37.8 | 3.8 |

The density of layer B is 0.87 for a compacting pressure of 75 MPa applied to the pellet. Its porosity is 45%.

The two-layer pellet is introduced into the water with mechanical stirring for two minutes. The pellet falls to the bottom of the container and layer A of the pellet breaks up by effervescence in approximately 20 seconds.

Stirring is halted and the suspended matter is left to separate by settling. The remaining part of the pellet (layer B) rises again to the surface and floats. It gradually dissolves while remaining at the surface. It thus releases the active chlorine until it completely dissolves after 3 hours at 23° C.

The level of active chlorine is measured in the water (at mid-height in the container comprising 10 liters of water) during the separation by settling as a function of the time at 23° C. The turbidity is measured using a turbidimeter calibrated in FTU unites (equivalent to NTU).

The results are given in table I below:

TABLE I

| Time (minutes) | [Active Cl] (mg/l) | Turbidity (FTU) |
|---|---|---|
| 0 | 0 | 430 |
| 10 | 0.16 | 67 |
| 23 | 0.26 | 36 |
| 44 | 0.44 | 13 |
| 58 | 0.53 | 8 |
| 81 | 0.62 | 6 |
| 104 | 0.73 | 6 |
| 180 | 0.81 | 5 |
| 300 | 0.82 | 5 |

It is found that the water is no longer turbid and that its content of active chlorine is equal to 0.53 mg/l after 24 hours. The pH of the treated water is 6.5.

The water-soluble cationic polymer/polyaluminum hydroxychloride (expressed as $Al_2O_3$) ratio which results in the flocculation/separation by settling being highly effective depends on the type and on the level of excipient employed for the disinfection. This optimum ratio must be at least equal to 2 ppm/20 ppm when the soluble excipient of layer B of the pellet (such as gum acacia, for example) is approximately 0.5 g and at least equal to 2 ppm/30 ppm for a weight of excipient of approximately 1 g.

Example 2

According to the Invention

This example illustrates the invention in the case where the excipient is a hydrophilic insoluble compound which swells in water.

10 liters of turbid water with the same composition as in example 1 are available.

For the purpose of treating this volume of 10 liters of turbid water, a two-layer pellet weighing 1.421 g, the first layer (layer A) weighing 0.921 g and the second layer (layer B) weighing 0.500 g, is prepared. The diameter and the thickness of the pellet are 20 mm and 1.9 mm respectively. The pellet is prepared by direct compression. The composition of the layers and the resulting level of each ingredient in the volume of water to be treated are given below:

| Composition layer A | mg in layer A | mg/l of water to be treated |
|---|---|---|
| Sodium bicarbonate | 193.2 | 19.3 |
| Citric acid | 82.8 | 8.3 |
| PAC ® 32 | 625.0 | 20* |
| PolyDADMAC ® DB45SH | 20.0 | 2 |

*Expressed as $Al_2O_3$

| Composition layer B | mg in layer B | mg/l of water to be treated |
|---|---|---|
| Lycatab ® PGS | 462.2 | 46.2 |
| DCCNa•$2H_2O$ | 37.8 | 3.8 |

The density of layer B is 0.79 for a compacting pressure of 62 MPa applied to the pellet. Its porosity is 51%.

The two-layer pellet is introduced into the water with mechanical stirring for two minutes. The pellet falls to the bottom of the container and layer A of the pellet breaks up by effervescence in approximately 20 seconds. Stirring is halted and the suspended matter is left to separate by settling. The remaining part of the pellet (layer B) rises again to the surface and floats.

The level of active chlorine is measured in the water (at mid-height in the container comprising 10 liters of water) during the separation by settling as a function of the time at 23° C. The turbidity is measured according to the same method as in example 1. The results are given in table II below:

TABLE II

| Time (minutes) | [Active Cl] (mg/l) | Turbidity (FTU) |
|---|---|---|
| 0 | 0 | 370 |
| 20 | 0.18 | 79 |
| 35 | 0.30 | 23 |
| 50 | 0.35 | 10 |
| 95 | 0.53 | 6 |
| 120 | 0.57 | 5 |
| 165 | 0.66 | 4 |

The pH of the water treated is 6.5. The residual level of active chlorine in the water treated is equal to 0.51 mg/l after 24 hours. Layer B of the pellet still floats and can be removed.

The monitoring of the consumption of active chlorine introduced into clean water, exposed to ambient air, indicates a loss of approximately 0.03 mg/hour, i.e. 0.7 mg/24 hours. This indicates that the water thus treated can be retained for between 1 and 3 days without specific precautions according to its level of initial organic contamination.

Example 3

According to the Invention

The operation is carried out identically to example 1 but citric acid is replaced by malonic acid in layer A at the level of 59.3 mg. The other ingredients and their respective levels are unchanged. The total weight of layer A is equal to 0.960 g. The composition of layer B is unchanged.

The turbidity of the water treated changes as in example 1. It reaches the value of 7 FTU after separating by settling for one hour, measured under the same conditions as those of example 1.

Example 4

According to the Invention

The operation is carried out identically to example 2 but citric acid is replaced by ARBOCEL® A300 in layer A at the level of 355 mg. The sodium bicarbonate is omitted. The other ingredients and their respective levels are unchanged. The total weight of layer A is equal to 1.000 g. The composition of layer B is unchanged.

After separating by settling for one hour, the turbidity of the water treated is 8 FTU, measured under the same conditions as those of example 1.

Example 5

Comparative 5 liters of turbid water with the same composition as that of example 1 are available.

The following ingredients, in the form of powders, are introduced simultaneously into this volume of water with mechanical stirring:
- 19.1 mg of (DCCNa.2H$_2$O), i.e. a concentration of DCCNa of 3.3 mg/l,
- 156.6 mg of PAC32®, i.e. a concentration of 10 mg/l, expressed as Al$_2$O$_3$,
- 5.3 mg of PolyDADMAC® 45 DBSH, i.e. a concentration of 1 mg/l.

Table III shows the content of active chlorine, measured as a function of the storage time at 23° C.

It is found that the level of active chlorine decreases very rapidly and becomes less than the WHO (World Health Organization) standard, which sets the minimum content (0.50 mg/l) to be maintained in treated water in order to prevent it from being recontaminated, after only 4 hours of exposure.

TABLE III

| Time (minutes) | [Active Cl] (mg/l) |
| --- | --- |
| 0 | 2.12 |
| 12 | 1.31 |
| 22 | 1.15 |
| 35 | 1.06 |
| 75 | 0.96 |
| 135 | 0.59 |
| 300 | 0.40 |

This shows that the active chlorine is rapidly consumed by the organic matter suspended in the water.

The simultaneous release of the active chlorine, of the flocculant and of the coagulant in the water to be treated does not make it possible to provide a fail-safe disinfecting treatment. This is because, according to the WHO, it is necessary to maintain a concentration of active chlorine in the water at least equal to 0.50 mg/l in order to have available disinfected water.

The invention claimed is:

1. A compacted solid product for the purification of water comprising at least one first layer and at least one second layer, wherein
   the first layer comprises at least one flocculating system and at least one disintegrating system,
   the second layer comprises at least one disinfectant which releases active chlorine on contact with water and at least one excipient for the disinfectant, the excipient releasing the disinfectant into the water at a controlled rate such that the excipient-disinfectant combination releases from 0.1 to 100 mg/l of active chlorine per hour,
   the flocculating system comprises at least one trivalent metal salt and at least one water-soluble cationic polymer, and
   the at least one water-soluble cationic polymer is present in a volume of water to be treated at a content ranging from 1 to 2 ppm.

2. The product as claimed in claim 1, wherein the trivalent metal salt is selected from the group consisting of iron sulfate, aluminum sulfate, polyaluminum hydroxychloride, and their mixtures.

3. The product as claimed in claim 1, wherein the water-soluble cationic polymer is a diallyldimethylammonium chloride water-soluble cationic polymer.

4. The product as claimed in claim 1, wherein the disintegrating system comprises at least one disintegrating agent selected from the group consisting of cellulose and its derivatives, the effervescent combinations of a water-soluble polyorganic acid and of a weak base, and their mixtures.

5. The product as claimed in claim 4, wherein the disintegrating agent is a cellulose.

6. The product as claimed in claim 4, wherein the disintegrating agent is an effervescent combination of a water-soluble polyorganic acid and of a weak base.

7. The product as claimed in claim 6, wherein the water-soluble polyorganic acid is selected from the group consisting of citric acid, malic acid, tartaric acid, malonic acid, fumaric acid, maleic acid, succinic acid, and their mixtures.

8. The product as claimed in claim 6, wherein the weak base is sodium bicarbonate.

9. The product as claimed in claim 4, wherein the disintegrating agent is present in the first layer at a content from 20% to 40% by weight with respect to the weight of the first layer.

10. The product as claimed in claim 1, wherein the disinfectant is selected from the group consisting of the sodium salt of N-chloro-4-methylbenzenesulfonamide in the anhydrous or dihydrate form, the sodium salt of 1,3-dichloro-s-triazine-2,4,6-trione in the anhydrous or dihydrate form, and their mixtures.

11. The product as claimed in claim 10, wherein the disinfectant is the sodium salt of 1,3-dichloro-s-triazine-2,4,6-trione in the dihydrate form.

12. The product as claimed in claim 1, wherein the excipient is selected from the group consisting of water-soluble compounds.

13. The product as claimed in claim 12, wherein the excipient is selected from the group consisting of gum arabic or acacia, gum tragacanth, locust bean gum, xanthan gum, guar gum, and their mixtures.

14. The product as claimed in claim 1, wherein the excipient is selected from the group consisting of hydrophilic insoluble compounds which swell in water.

15. The product as claimed in claim 14, wherein the excipient is selected from the group consisting of modified starches, gelatinized starches, potato starch, and their mixtures.

16. The product as claimed in claim 1, wherein all the compounds constituting the product are edible.

17. The product as claimed in claim 1, wherein when the first layer has completely broken up, the second layer rises and floats.

18. A process for the preparation of a compacted solid product for the purification of water comprising at least one first layer and at least one second layer, wherein the process comprises the following stages:
   a) mixing at least one flocculating system and at least one disintegrating system in powdered form;
   b) mixing at least one disinfectant in powdered form, which releases active chlorine on contact with water, and at least one excipient for the disinfectant, the excipient releasing the disinfectant into the water at a controlled rate such that the excipient-disinfectant combination releases from 0.1 to 100 mg/l of active chlorine per hour;
   c) precompacting the mixture obtained in b) in a pelleting machine; and
   d) adding the mixture obtained in a) to the pelleting machine and the combined mixture is compacted in order to obtain a two-layer product, the flocculating system comprises at least one trivalent metal salt and at least one water-soluble cationic polymer, and the at least one water-soluble cationic polymer is present in a volume of water to be treated at a content ranging from 1 to 2 ppm.

* * * * *